United States Patent
Campbell et al.

(10) Patent No.: US 7,103,458 B2
(45) Date of Patent: Sep. 5, 2006

(54) AUTOMATION SYSTEM USING WIRELESS HIGH FREQUENCY

(75) Inventors: Philip L. Campbell, Millbrook, NY (US); Francis F. Szenher, Fishkill, NY (US); Uldis A. Ziemins, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 10/709,351

(22) Filed: Apr. 29, 2004

(65) Prior Publication Data
US 2005/0246077 A1    Nov. 3, 2005

(51) Int. Cl.
H04B 1/69    (2006.01)
G06F 19/00   (2006.01)

(52) U.S. Cl. ........................................ 701/23; 375/130

(58) Field of Classification Search ............ 701/23–24; 342/457; 370/320, 335, 342, 441; 375/130, 375/135–136, 146–147
See application file for complete search history.

(56) References Cited

U.S. PATENT DOCUMENTS 5,912,644 A * 6/1999 Wang ........................ 342/457
6,204,813 B1 * 3/2001 Wadell et al. .............. 342/463

\* cited by examiner

*Primary Examiner*—Y. Beaulieu
(74) *Attorney, Agent, or Firm*—Kerry Goodwin

(57) ABSTRACT

Communication between a controller and a set of automated vehicles is improved by use of an RF link that employs a high frequency spread spectrum modem that establishes a low noise link in a high noise industrial environment and also shares the relevant frequency range with a wireless telephone system.

20 Claims, 3 Drawing Sheets

AUTOMATION SYSTEM USING WIRELESS HIGH FREQUENCY

BACKGROUND OF INVENTION

The field of the invention is that of RF communication between a controller and a set of autonomous automated vehicles transporting materials within a building or other location; in particular transporting a load along a track in a remotely controlled vehicle.

In the field of material transport through automated vehicles, it is necessary for a controller to communicate with individual ones of the vehicles to tell it to start, follow a certain path to a destination and to unload.

Communication between the controller and the individual vehicles is plagued by noise and other interference.

In the past, the RF link was completed with low frequency wireless communication, typically not in compliance with an FCC standard.

Various suppliers use infra-red optical links, ethernet or other relatively low RF frequency communications.

These systems suffer from cross talk between different vehicles, loss of signal, short range (line of sight) or a requirement of physical contact between the vehicle and an antenna or other means of carrying the control signals.

In one example, cross talk between individual vehicles results in vehicle A obeying a command to stop that was intended for vehicle B, with the result that vehicle A is stranded in a place where it does not belong.

In another example, vehicle A could obey a command to start that was received at an inopportune time—e.g. during a loading process.

Similarly, in a common approach to vehicle control, the vehicle is not left alone to proceed to a destination, but is periodically told to continue moving, with the fail-safe response to stop (for safety reasons). If contact is lost with the controller, the vehicle will be stranded between a start location and an end location.

Optical systems require that there be a straight line between the controller or relay points for controller signals and the sensor on the vehicle. In a dirty factory environment, the sensor may become coated with dust and unable to sense signals.

Conventional present-day systems use open-loop technology, in which the vehicle is told to start moving and then continues until it reaches its destination or suffers a malfunction.

Control signals are conventionally broadcast throughout a relatively large factory space, with potential for causing interference with other equipment that responds to a signal meant for the material handling system.

Since the controller doesn't know where individual vehicles are, collision avoidance requires a conservative margin of safety such as permitting only one vehicle at a time to operate within a relatively large area.

The art could benefit from a closed-loop system that is resistant to noise and has a high degree of separation for simultaneous operation.

SUMMARY OF INVENTION

The invention relates to a system for controlling automated material handling units in a high-noise environment.

A feature of the invention is a closed loop system in which the individual units communicate with a central controller through a high frequency spread spectrum modem.

Another feature of the invention is the sharing of the frequency band used for material handling with a telephone system.

Yet another feature of the invention is avoidance of collisions between carriers.

Yet another feature of the invention is applicability to a polling or interrupt driven communication scheme.

Yet another feature is isolation of zones using frequency isolation and a checksum message header in a communication protocol.

Yet another feature is the use of feeder cable (twin lead or leaky coaxial cable 75–300 ohms) for short range coupling and omni-directional antennas to enable communication in a noisy environment.

DETAILED DESCRIPTION

Figure 3:
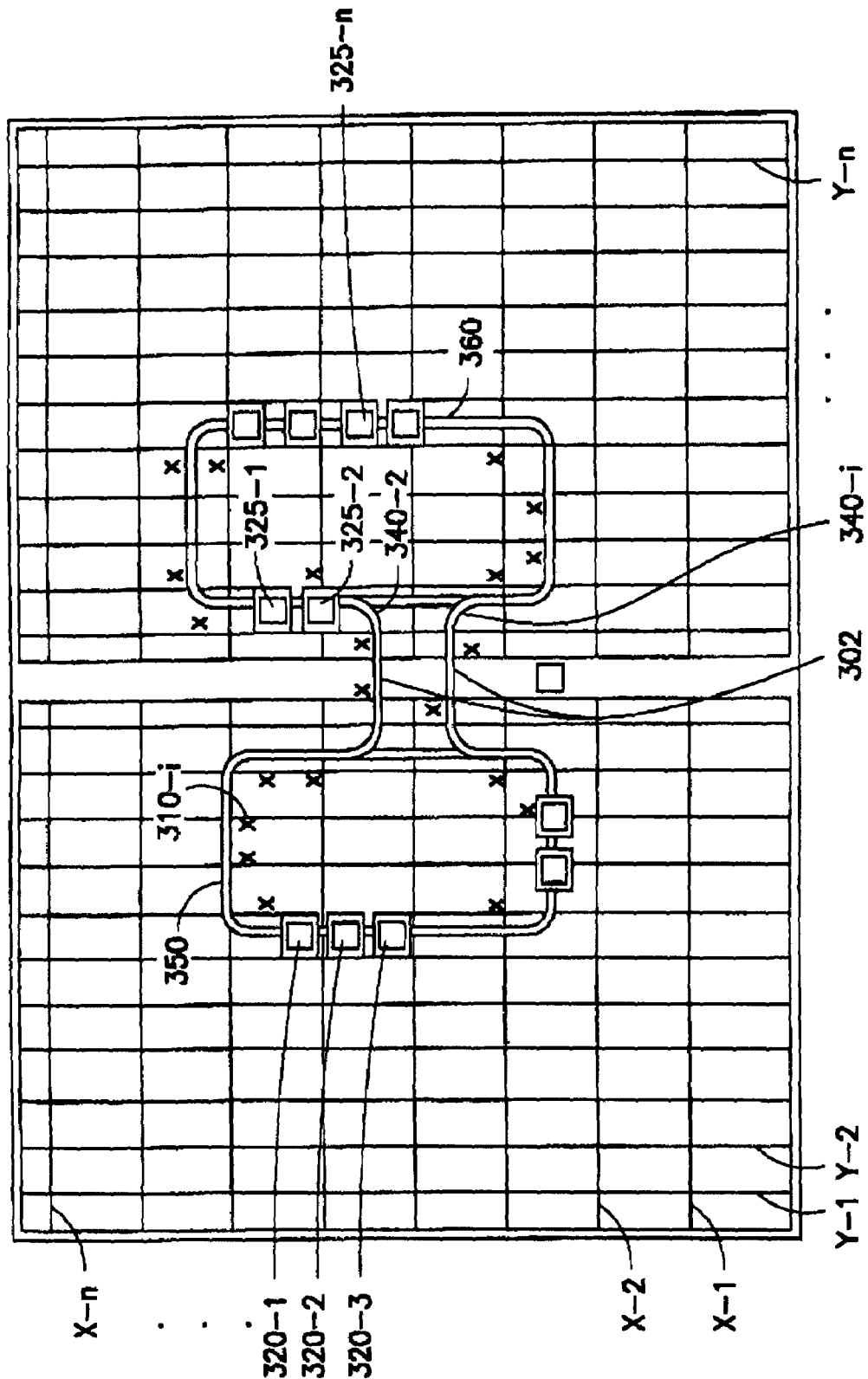
FIG. 3 illustrates a top view of a typical installation.

FIG. 3 illustrates a simplified overhead view of factory installation of the invention. A grid Y-1, Y-2, - - - Y-n and X-1, X-2, - - - X-m divides the Y-direction and X-directions. A pair of loop tracks 350 on the left and 360 on the right support material carriers that stop at a set of processing locations 320-1, 320-2, etc on the left loop and 325-1, 325-2, 325-n on the right loop. Between the loops switch points 340-1 to 340-4 permit individual carriers to leave one loop and travel to another one.

In a typical installation of the invention, there may be many loops, which will sometimes be referred to as bays in typical terminology. The example illustrated is taken from a semiconductor wafer processing facility, or fab but the invention may be practiced in many locations and types of facilities.

For simplicity, two loops are shown, but those skilled in the art will appreciate that many loops can be connected along a main track, with carriers branching to and from the main track to reach destinations in other bays.

The X symbols denoted 310-i represent the locations of markers along track 350 and 360. These markers may be part of an encoder system such as supplied by NorthStar Technologies of Waterville Ohio or a number of other commercial suppliers. The particular example cited is capable of 10 micron resolution. Designers will select a system suitable for their needs based on the usual cost/accuracy tradeoffs.

Figure 2:
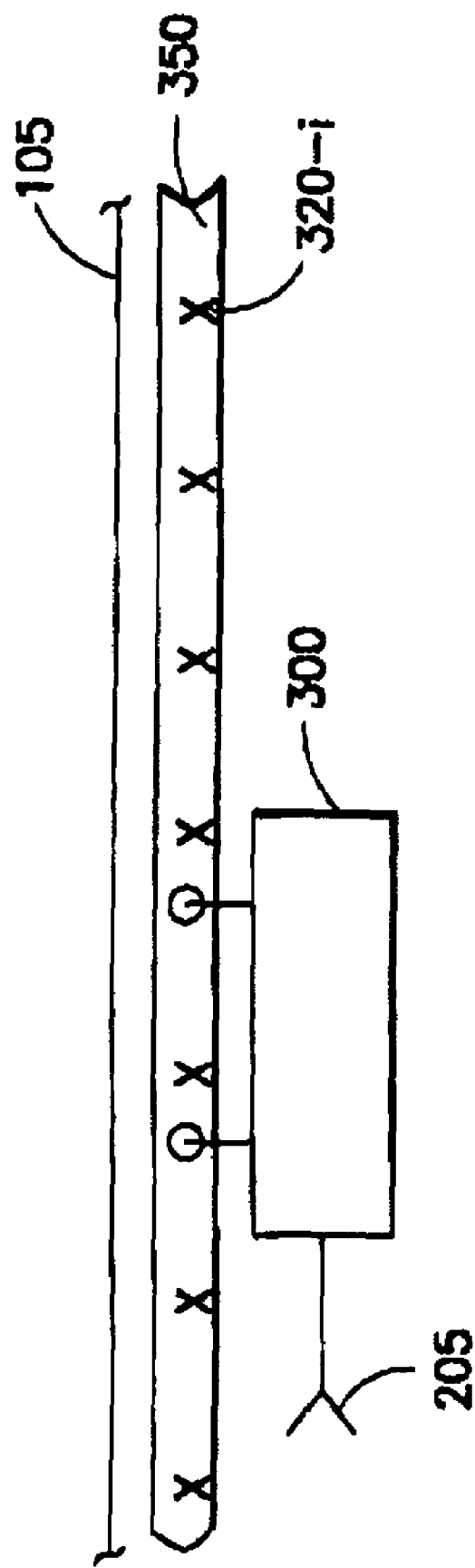
FIG. 2 illustrates a detail of the leaky coaxial antenna which encompasses the entire perimeter of the bay.

FIG. 2 shows a simplified side view of a portion of a track. A carrier indicated schematically by box 300 travels along a track 350. Markers 320-i are positioned along the track, so that the carrier receives as input sequential indications (e.g. magnetic pulses) that represent passage past a marker. The markers may be coded with identifying numbers or the system may keep count of the markers passed since the start of a particular trip.

At the top of FIG. 2, line 105 represents an antenna, illustratively a twin-lead, that carries a signal from the central controller of the system. Antenna 205 receives signals from antenna 105 and transmits return signals, so that the system has the capability of closed loop operation, in which the controller knows the location of individual carriers and individual carriers respond to commands from the controller.

Closed-loop operation is desirable even when the vehicles are autonomous, since one or more vehicles may make an error. The controller can then intervene to avoid a collision or other problem.

As a simplified illustration, suppose the nth carrier is to travel from location 320-2 on track 350 to location 325-3 on loop 360, carrying a load of integrated circuit wafers from one processing station to another.

The carrier will travel to the first input location, pick up its load using standard robotic material handling techniques known in the art and travel to the destination where it unloads the cargo.

On the way, the carrier will pass by other processing locations and pass through two switches 340. At each switch, it may encounter another carrier.

Avoidance of collisions is required in material handling systems using multiple carriers and the methods in the past have been quite conservative, with carriers being prohibited from entering a relatively large region that contains another carrier.

Since the master controller knows where each carrier is located, it can shunt aside one carrier to let another pass (or hold up one carrier while another carrier passes on an intersecting track, etc.). This permits the system to use carriers more efficiently, because less time will be wasted while a carrier waits for a free track.

The system achieves high speed throughput at 115.2 Kbps by employing forward error correction and multiple resends. A master control station utilizes FHSS (frequency hopping spread spectrum) for reliable secure data transmission. Each vehicle sends data back to the master controller and the master controller broadcasts to all vehicles via an encrypted header for segregating bays and zones in the same proximity. A frequency range of 902 to 928 MHz is utilized and shared with a wireless phone system.

In the course of operation, vehicle A broadcasts its location to all vehicles within the limited reception range. These other vehicles compare the path of vehicle A and compute whether they will collide. A predicted collision will result in either a signal to the controller to work out a solution, or an autonomous solution, depending on the system structure.

Figure 1:
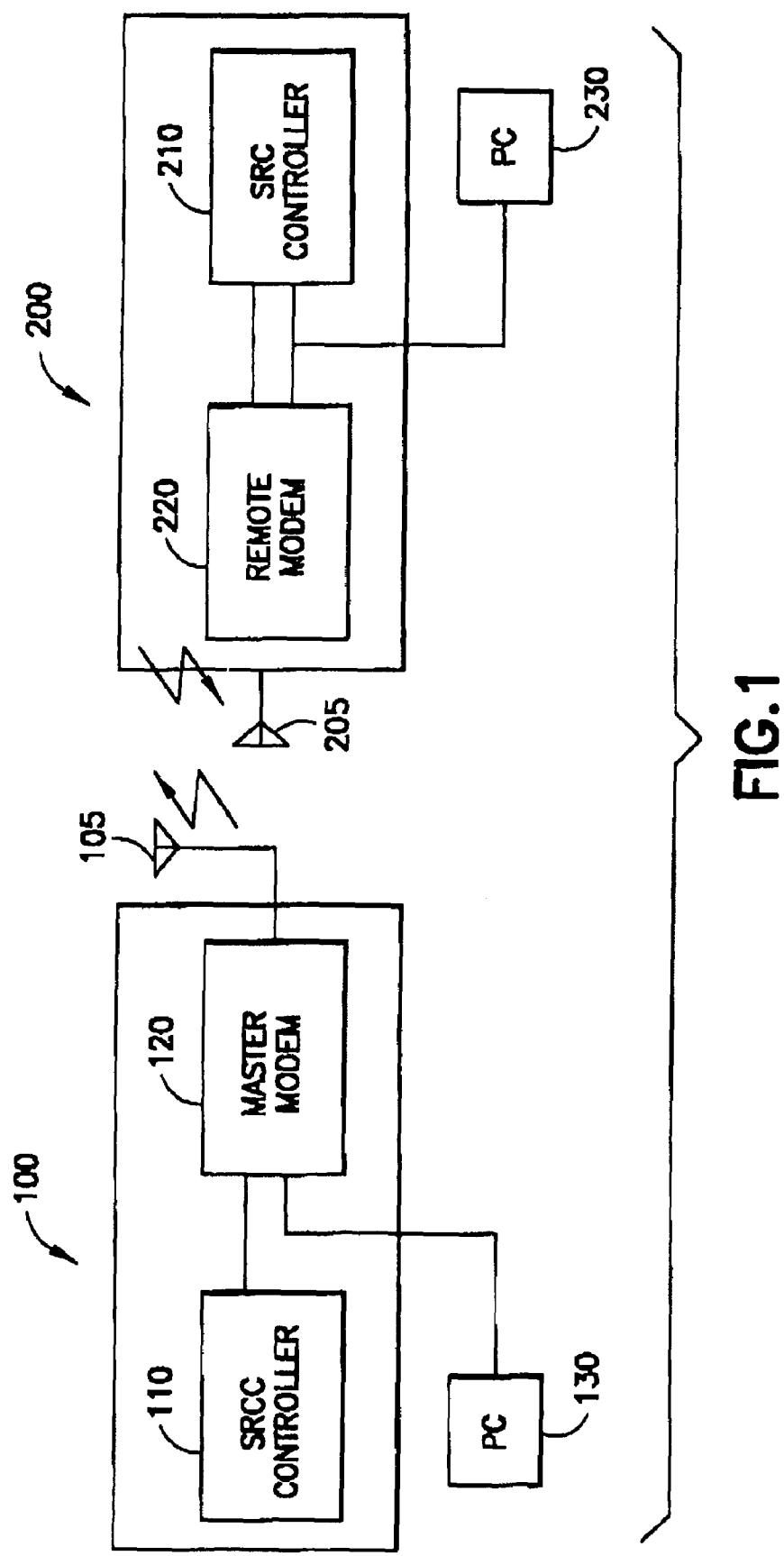
FIG. 1 illustrates in block diagram form a master controller and unit controller.

FIG. 1 illustrates simplified block diagrams of the master controller and of a typical carrier.

On the left, controller 100 contains a block 110 that contains the software that drives the system, illustratively a general purpose computer, and a modem 120 that is illustratively a high frequency spread spectrum modem. At the bottom of the Figure, PC 130 is available, either continuously or at intervals, to supply greater computing power to run diagnostic tests to set up the system or diagnose faults, both of which typically require a more sophisticated system and much more complex software than the operation software.

On the right of the Figure, carrier 200 contains the same modem 220 connected to an omni-directional antenna 205 on the vehicle. Controller 210 contains the robotic control software to load, unload the cargo, operate the vehicle, etc.

The carrier will typically be waiting for commands from the system controller for most of the time. When it receives a command, e.g. go to location 320-4 and pick up a load, the controller 210 branches to the correct location in its memory and executes the detailed instructions to carry out the high-level command.

In a particular example, the modem is a commercially available MDS TransNet FHSS (Frequency Hopping Spread Spectrum) modem, available from MDS Inc., operating in the ISM band of 902 to 928 MHz. Other modems could be used in the high frequency range of 1–5 MHz. An advantage of the present invention is that the same band can be shared with a telephone system without interference.

The capacity of systems according to the invention is quite large; e.g. 28 separate controller sub-systems for controlling handling in different portions of the facility. Each sub-system has a different address, which facilitates separation of commands.

For example, the controller in the $12^{th}$ bay will send commands to the carriers operating in that bay. The carriers in the $11^{th}$ and $13^{th}$ bays will be in range of the transmissions in the 12th bay (and vice versa). The $12^{th}$ controller will send out its commands with an address header on the command that is recognized by its carriers and ignored by other carriers.

When a carrier travels from the $12^{th}$ bay to the $13^{th}$ bay, it is recognized by the local controller and thereafter controlled by it. A straightforward way to implement the handoff is for the local controller to send a signal to the master controller that, in turn, instructs the local controller in the next bay that the carrier is coming, the address of the carrier and other information as required by that particular system to permit the new local controller to take over control of the carrier while it is in that territory.

Crosstalk between vehicles in a bay and/or between adjacent bays is avoided by use of the spread spectrum modems and also by a header on the messages that identifies the bay and the vehicle within the bay. A unique header protocol is required to isolate one or more vehicles that constitute a group or single vehicle depending on the application. The header utilizes a checksum or parity control to indicate which vehicle and bay the message is directed to and is to be processed by.

Signal to noise ratio (SNR) has been optimized in the system. By amplifying the transmitter's power and then using various attenuators, located in the coax to distribute power in various portions of the bays, the SNR was optimized to improve communication between modems and separation of vehicles and bays.

Antenna design and implementation were found have a significant effect on reliable communication. The location and combination of both omni-directional and leaky coax antennas were also significant. There is an omni-directional antenna on the side of each vehicle which is approximately 6 inches from the leaky coaxial cable located around the perimeter of each bay. Various bays were equipped with omni antennas located at strategic locations (determined empirically) in the bay to improve communication, so that there were two RF links in such bays the link through the extended conductor and a direct link over the air interface between the two omni antennas.

The system designer may choose to have the modems respond to a fixed address or, alternatively, respond to a channel. For example, in mobile phone systems, the nth user has a spreading code and responds to any signals that are picked up by the spreading code—i.e. on that channel. On a computer bus, each peripheral has an address and ignores data that it could respond to if the address is wrong.

It is an advantageous feature of the invention that it is possible to operate the inventive system simultaneously with a wireless communication system using the same frequency band. Spectrum is always limited and a requirement that there be no activity on the same band might prevent the handling system from being used.

While the invention has been described in terms of a single preferred embodiment, those skilled in the art will recognize that the invention can be practiced in various versions within the spirit and scope of the following claims.

The invention claimed is:

1. A system for controlling a set of material carriers under control of a master controller comprising:
   a set of at least two material carriers having a spread spectrum RF transceiver;
   at least one master controller unit having a spread spectrum RF transceiver; in which communication between said controller and said set of carriers passes through a link comprising an extended conductor connected to said controller and an antenna connected to each carrier, and
   each carrier contains a carrier processor for processing data received by said carrier RF transceiver.

2. A system according to claim 1, in which said extended conductor comprises a coaxial cable having RF leakage along its length sufficient to transmit to said antennas.

3. A system according to claim 1, in which said extended conductor comprises a twin-lead conductor.

4. A system according to claim 1, in which each carrier receives a location signal from nearby carriers indicating the position of said nearby carriers and broadcasts location information indicating its own location.

5. A system according to claim 4, in which at least one carrier processes said location signal from nearby carriers indicating the position of said nearby carriers to calculate therefrom whether said at least one carrier will collide with one of said nearby carriers.

6. A system according to claim 4, in which said controller receives said location signal from said nearby carriers indicating the position thereof and calculates therefrom whether any of said nearby carriers will collide with another one of said nearby carriers.

7. A system according to claim 1, in which said master controller communicates with a set of zone controllers, each of which controls a set of carriers within a corresponding zone of said system.

8. A system according to claim 7, in which said master controller communicates with said set of zone controllers, through separate channels in said RF spread spectrum.

9. A system according to claim 7, in which said master controller communicates with said set of zone controllers, through separate addresses for each zone controller.

10. A system according to claim 7, in which said zone controller communicates with said set of carriers through separate channels in said RF spread spectrum.

11. A system according to claim 7, in which said zone controller communicates with said set of carriers through separate addresses for each carrier.

12. A system according to claim 1, in which said RF transceivers operate in a frequency band that is also used by a telecommunications system.

13. A system according to claim 1, further comprising at least one zone, each zone being provided with at least one antenna connected to a zone controller, whereby said at least one zone has an air interface link in addition to said link comprising an extended conductor.

14. A system according to claim 13, in which each carrier receives a location signal from nearby carriers indicating the position of said nearby carriers and broadcasts location information indicating its own location.

15. A system according to claim 1, further comprising at least one zone in which said extended conductor further comprises at least one attenuator adapted to reduce signal power transmitted from said extended conductor in an area of said at least one zone.

16. A method of exchanging data between a set of material carriers under control of a master controller and said master controller comprising steps of:
   providing a set of at least two material carriers having a spread spectrum RF transceiver;
   providing a master controller unit having a spread spectrum RF transceiver;
   communicating between said controller and said set of carriers through a link comprising an extended conductor connected to said controller and an antenna connected to each carrier; and
   processing, in each carrier, data received by said carrier RF transceiver.

17. A method according to claim 16, further comprising a step in which each carrier receives a location signal from nearby carriers indicating the position of said nearby carriers and broadcasts location information indicating its own location.

18. A method according to claim 17, further comprising a step in which at least one carrier processes said location signal from nearby carriers indicating the position of said nearby carriers to calculate therefrom whether said at least one carrier will collide with one of said nearby carriers.

19. An automated material transport system providing improved control communications comprising:
   at least one material carrier including:
      a material carrier controller,
      a material carrier spread spectrum modem operably coupled to the material carrier controller, and
      a material carrier antenna operably coupled to the material carrier modem; and
   a master controller including:
      a master controller processor,
      a master controller spread spectrum modem operably coupled to the maser controller processor, and
      a master controller antenna operably coupled to the master controller modem,
   wherein:
      the at least one material carrier is adapted to travel along a predetermined path, and
      the master controller antenna is at least substantially coextensive with the predetermined path.

20. The automated material transport system of claim 19, further comprising a plurality markers placed at predetermined intervals along the predetermined path, the material carrier controller being adapted to determine position along the predetermined path of the at least one material carrier based upon information obtained from the plurality of markers, and the material carrier controller being adapted to communicate position of the material carrier to the master controller via the material carrier spread spectrum modem and the material carrier antenna.

* * * * *